(12) United States Patent
Trace

(10) Patent No.: US 7,360,304 B2
(45) Date of Patent: Apr. 22, 2008

(54) FOLDING STAND FOR A PORTABLE CRIMPING DEVICE

(75) Inventor: Benjamin Michael Trace, Tallmadge, OH (US)

(73) Assignee: Parker-Hannifin Corporation, Cleveland, OH (US)

(*) Notice: Subject to any disclaimer, the term of this patent is extended or adjusted under 35 U.S.C. 154(b) by 465 days.

(21) Appl. No.: 11/085,882

(22) Filed: Mar. 22, 2005

(65) Prior Publication Data

US 2006/0214082 A1    Sep. 28, 2006

(51) Int. Cl.
*B23P 19/00* (2006.01)
(52) U.S. Cl. .............................. 29/751; 29/753; 29/237; 29/721; 269/272
(58) Field of Classification Search ................... 29/729, 29/739, 740–751, 753, 237; 269/272; 72/402, 72/316–317, 399
See application file for complete search history.

(56) References Cited

U.S. PATENT DOCUMENTS

| | | | |
|---|---|---|---|
| 1,658,189 A | 2/1928 | Embury | |
| 2,543,352 A | 2/1951 | Brown | |
| D179,992 S | 4/1957 | Walker et al. | |
| 4,033,022 A * | 7/1977 | Currie et al. | 29/237 |
| 4,309,892 A * | 1/1982 | Currie | 72/402 |
| 4,484,384 A * | 11/1984 | Knowles | 29/237 |
| 4,541,655 A | 9/1985 | Hunter | |
| 4,953,383 A * | 9/1990 | Stiver et al. | 72/402 |
| 4,989,813 A | 2/1991 | Kim et al. | |
| 5,207,791 A | 5/1993 | Scherbarth | |
| 6,098,443 A * | 8/2000 | Muller et al. | 72/412 |
| 6,125,681 A * | 10/2000 | Orcutt et al. | 72/402 |
| 6,481,764 B1 | 11/2002 | Kwok | |
| 6,715,335 B2 * | 4/2004 | Huebner et al. | 72/402 |
| 7,134,190 B2 * | 11/2006 | Bungo et al. | 29/753 |

* cited by examiner

*Primary Examiner*—Minh Trinh
(74) *Attorney, Agent, or Firm*—Joseph J. Pophal; Daniel J. Whitman

(57) ABSTRACT

A folding stand adapted to be secured to the bottom wall of a portable crimping device which, in a folded position, is substantially flat against a wall portion thereof and, in an unfolded position, vertically raises the crimping device to a predetermined working height, the folding stand including a base portion, having a rear pivot axis, a mounting portion, having a front pivot axis, and a pair of elongated cross members for interconnecting the base and mounting portions, via oppositely directed fastening members, with opposed ends of the cross members being adapted to pivot, relative to the adjoining base and mounting members, between respective first and second stop point folding surfaces, in a folded position, and first and second stop point standing surfaces, in an unfolded position, the respective stop point folding and stop point standing surfaces being angularly spaced therebetween via first and second predetermined reflex angles.

15 Claims, 11 Drawing Sheets

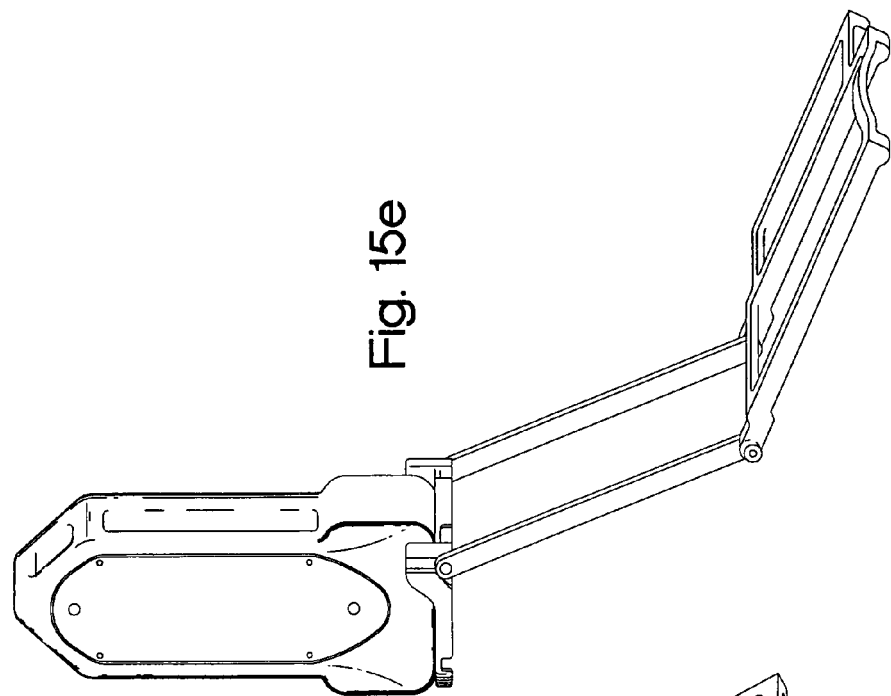
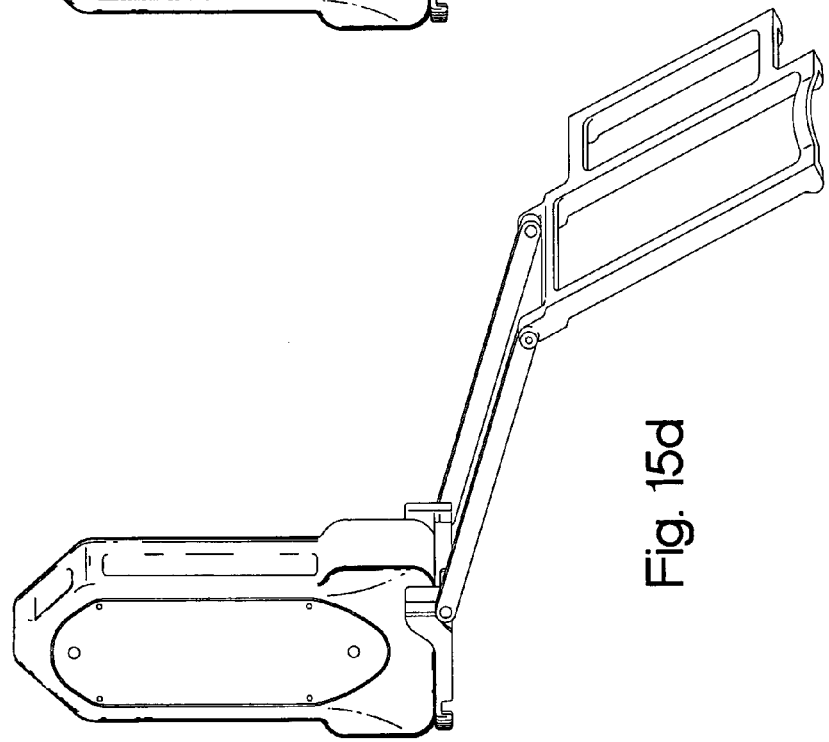

FOLDING STAND FOR A PORTABLE CRIMPING DEVICE

CROSS REFERENCE TO RELATED CASES

None.

FIELD OF THE INVENTION

The present invention pertains to a compact, light weight, folding stand adapted for use with portable hydraulic hose crimpers designed to crimp a hose fitting to flexible hoses and the like. The purpose of this stand, in its unfolded position, is to position the portable crimping device at a predetermined working height, from a support surface during hose assembly. When not required, the stand is folded substantially flat and secured to an adjoining wall portion of the crimping device for stowage and ease of portability therewith.

BACKGROUND OF THE INVENTION

The assignee of the present invention, Parker-Hannifin Corporation, of Cleveland, Ohio, U.S.A., manufactures and markets, under the trade name "MiniKrimp" a compact, lightweight, portable, hand-held if so desired, apparatus for crimping a hose fitting to the end of, for example, of thermoplastic, fluorocarbon and rubber hoses, with the structural and operational details of this portable crimping device being are set forth in U.S. Pat. No. 6,715,335 B2 to Huebner et al.

The positioning the portable crimping device a predetermined distance from a base or support surface, during the hose-to-fitting crimping process, allows the bottom surface of the crimping device, where the hose to be crimped is entered into this device, to be free from obstructions, thus improving both the cycle time and the ease of operation.

Thus, there exists a need in the art for a mechanism for raising the portable crimping apparatus to the desired height, the key attributes for which included: low weight; ease of folding and unfolding; the absence of a locking mechanism in the unfolded or working position; a flat folding position on a side surface of the crimping device and ready portability therewith; as well as a simple but sturdy kinematical folding design; and low manufacturing cost.

The patent literature includes folding support devices for everything from flashlights (U.S. Pat. No. 1,658,189 to Embury) to camera tripod support means (U.S. Pat. No. 2,543,352 to Brown), to adjustable support bases for computer devices and the like (U.S. Pat. No. 4,989,813 to Kim et al.), to universal supports for hand operated devices (U.S. Pat. No. 5,207,791 to Scherbarth), and even to a collapsible milk carton holder (U.S. Des. 179,992 to Walker). However, none of these prior art apparatuses, include the novel structures, details and combinations of the present invention.

SUMMARY OF THE PRESENT INVENTION

Accordingly, in order to increase the versatility and ease of operation or use of the portable hydraulic hose crimper the foldable or folding stand of this invention permits, in an unfolded position, the raising of the portable crimper a predetermined working distance or height from a support surface, while in its folded position, being folded substantially flat against and secured to a vertical wall portion of the crimping device.

Specifically, in terms of structure, the foldable stand for a portable crimping device of this invention is adapted to be secured to a horizontal bottom wall surface of the crimping device, with the foldable stand comprising in combination: (a) a base portion, including a pair of spaced, main chassis, longitudinal base members, interconnected, on first ends thereof, via a first transversely directed connecting portion and interconnected, inboard of second ends thereof, via a second transversely directed connecting portion, the base member second ends each having a horizontal coaxial first pivot aperture in a common first pivot axis, the second connecting portion including a pair of laterally separated, coplanar, first stop point folding areas and a circumferentially spaced pair of laterally separated, coplanar, first stop standing point areas; (b) a mounting portion, including a generally ring shaped body portion having a top surface, a bottom surface, a central aperture, a plurality of spaced through bores and a pair of aligned, spaced, attachment bosses, at opposite sides of a front end portion of the body portion, the attachment bosses each including a lateral, vertical attachment portion having an opposed, horizontal coaxial second pivot aperture in a common second pivot axis, parallel with the first pivot axis, each attachment boss including a second stop point folding area, in first common plane, and a circumferentially spaced second stop point standing area, in a second common plane; (c) a pair of elongated cross members, each having a top surface, a bottom surface and first and second ends having first and second through bores, respectively; (d) a first pair of oppositely directed fastening members for pivotally connecting the first ends of the cross members, via the first bores, with respective ones, of the base portion second ends, via the first pivot apertures, thereby permitting relative movement, between the base portion and the cross members, for a first predetermined reflex angle between the first stop point folding areas and the first stop point standing areas; and (e) a second pair of oppositely directed fastening members for pivotally connecting the second ends of the cross members, via the second bores, with respective ones, of the mounting portion attachment bosses, via the second pivot apertures, thereby permitting relative movement between the mounting portion and the cross members, for a second predetermined reflex angle between the second stop point folding areas and the second stop point standing areas.

The first predetermined reflex angle has an angular extent of about 315 degrees, while the second predetermined reflex angle has an angular extent of about 240 degrees.

When the cross members abut the first and second stop point standing areas, respectively, the foldable stand is in an unfolded position. The folding stand, in its unfolded position, utilizes the mass of the portable crimping device, acting via its center of gravity, through the first and second stop point standing areas, to retain the foldable stand in the unfolded position.

When the cross members abut the first and second stop point folding areas, respectively, the foldable stand is in a folded position.

In one variation, one of the mounting portion attachment bosses includes, in an outer end surface thereof, a further bore portion and the base portion first connecting portion includes a further through bore, the further bore and through bore being axially aligned when the foldable stand is in the folded position, with an additional fastening member, extending, through the further through bore into the further bore, being adapted to fixedly retain the base portion to the mounting portion, in the folded position, thus fixedly securing the folding stand, in its folded position, to the portable crimping device and being portable therewith. In the folded position of the folding stand, the folded stand adjoins a front surface portion of the portable crimping device.

In another variation, the attachment boss further bore portion serves as retainer for the additional fastening member when the folding stand is in its unfolded position.

In a further version, the bottom wall surface of the portable crimping device abuts the top surface of the mounting portion and is secured thereto, via a plurality of further fastening members, extending through the plurality of through bores, in the body portion of the mounting portion, into a plurality of aligned bores in the crimping device bottom wall surface.

In a differing version, the first and second pairs of fastening members take the form of stainless steel shoulder bolts.

In yet another version, the first transversely directed connecting portion includes an arced center portion that can serve as an operator handle during folding and unfolding of the foldable stand.

A still further version includes a parallel, auxiliary chassis, longitudinal base member, interconnected, on opposed ends thereof, via further transversely directed connecting portions, with one of the main chassis, longitudinal base members, inboard of the ends thereof. The further connecting portions of the auxiliary chassis base member preferably include a plurality of spaced through bores, the through bores being aligned with matching through bores in the base portion of a hydraulic pump normally mounted on a side surface of the portable crimping device, thereby permitting the mounting of the pump, via suitable fastening members, to the base portion.

In yet a differing version, the ends of bottom surfaces of the main and auxiliary chassis longitudinal base members are provided with respective foot portions, with the lowermost surface of each of the foot portions defining an area in a common plane that, in turn, defines the footprint of the base portion.

Another embodiment of this invention pertains to a folding stand for a portable crimping device, the folding stand being adapted to be secured to the horizontal bottom wall of the crimping device and adapted, in a folded position, to be folded substantially flat against a vertical wall portion of the crimping device, and, in an unfolded position, to vertically raise the crimping device to a predetermined working height from a support surface, wherein the folding stand comprises: a. a base portion, including a pair of spaced main members, connected on front ends thereof, via a transverse, front, connecting portion, and connected, inboard of rear ends thereof, via a transverse, rear, connecting portion, with each base member rear end having a first pivot aperture coaxial with a rear pivot axis, the rear connecting portion including laterally spaced, coplanar, first stop point folding surfaces and an angularly spaced pair of laterally spaced, coplanar, first stop point standing surfaces; b. a mounting portion, including a generally annular body portion, having a top surface, a bottom surface, a central opening, a plurality of spaced through bores and a pair of spaced, opposed attachment bosses, located at opposite sides of a front body portion thereof, each attachment boss including a lateral attachment portion having a second pivot aperture in a common front pivot axis, parallel with the rear pivot axis, each attachment boss including a second stop point folding surface, in a first common plane, and an angularly spaced second stop point standing surface, in a second common plane; c. a pair of elongated cross members, each having a top and bottom surfaces, as well as front and rear ends having front and rear through bores, respectively; d. a pair of oppositely directed rear shoulder bolts for pivotally connecting the rear ends of the cross members, via the rear bores, with respective ones of the base portion rear ends, via the rear pivot apertures, thereby permitting relative movement, between the base portion and the cross members, for an angle of about 315 degrees, between the first stop point folding surfaces and the first stop point standing surfaces; and e. another pair of oppositely directed front shoulder bolts for pivotally connecting the front ends of the cross members, via the front bores, with respective ones of the mounting portion attachment bosses, via the rear pivot apertures, thereby permitting relative movement between the mounting portion and the cross members, for an angle of about 240 degrees, between the second stop point folding surfaces and the second stop point standing surfaces.

In one variation, the cross members substantially abut the first and second stop point surface, respectively, when the folding stand is in an unfolded position, the folding stand, in the unfolded position, utilizing the mass of the crimping device, acting through its center of gravity and the first and second stop point standing surfaces, to retain the stand in the unfolded position.

In another variation, when the cross members abut the first and second stop point folding surfaces, the folding stand is in a folded position. Preferably, one of the attachment bosses of the mounting portion includes, in an outer surface thereof, a further bore portion and the base portion front connecting portion includes a further through bore, the latter and the further bore portion being axially aligned when the folding stand is in its folded position, with a fastening member, extending through the further through bore into the further bore portion, the fastening member being adapted to fixedly retain the base portion to the mounting portion, thus fixedly securing the folding stand to the crimping device.

In a further variation, the bottom wall surface of the crimping device adjoins the top surface of the mounting portion and is secured thereto with a plurality of further fastening members extending through the plurality of through bores in the mounting portion.

A yet another variation includes a parallel longitudinal base member, connected, on respective front and rear ends thereof, via additional transverse connecting portions, with an adjoining one of the main base members, inboard of the ends thereof. The additional transverse connecting portions include a plurality of additional through bores, the through bores being aligned with corresponding through bores in the base portion of a hydraulic pump normally removably mounted on a side surface of the crimping device, thereby permitting the relocation and mounting of the pump, via suitable fasteners, to the base portion.

The previously-described advantages and features, as well as other advantages and features, will become readily apparent from the detailed description of the preferred embodiments that follow.

BRIEF DESCRIPTION OF THE DRAWINGS

FIGS. 15A-15G illustrate the motion sequence, starting the fully folded position in FIG. 15A and successively progressing, via the positions shown in FIGS. 15B-15F, until reaching the full working position shown in FIG. 15G.

DETAILED DESCRIPTION OF THE PREFERRED EMBODIMENT

Figure 1:
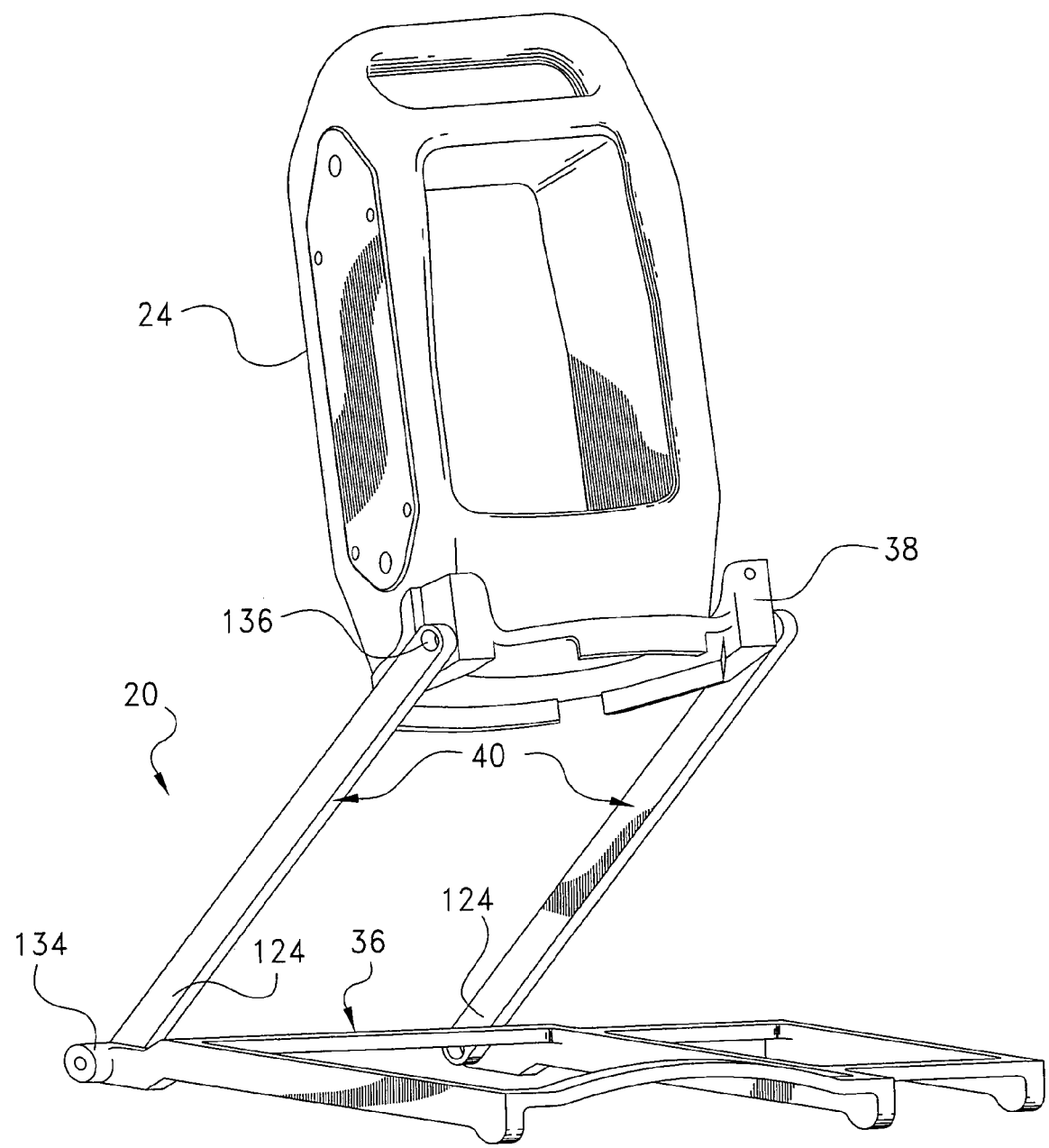
FIG. 1 is a perspective view of the folding stand of the present invention, in its working position, together with a portable crimping device housing, shown in phantom lines, mounted thereon.
Figure 2:
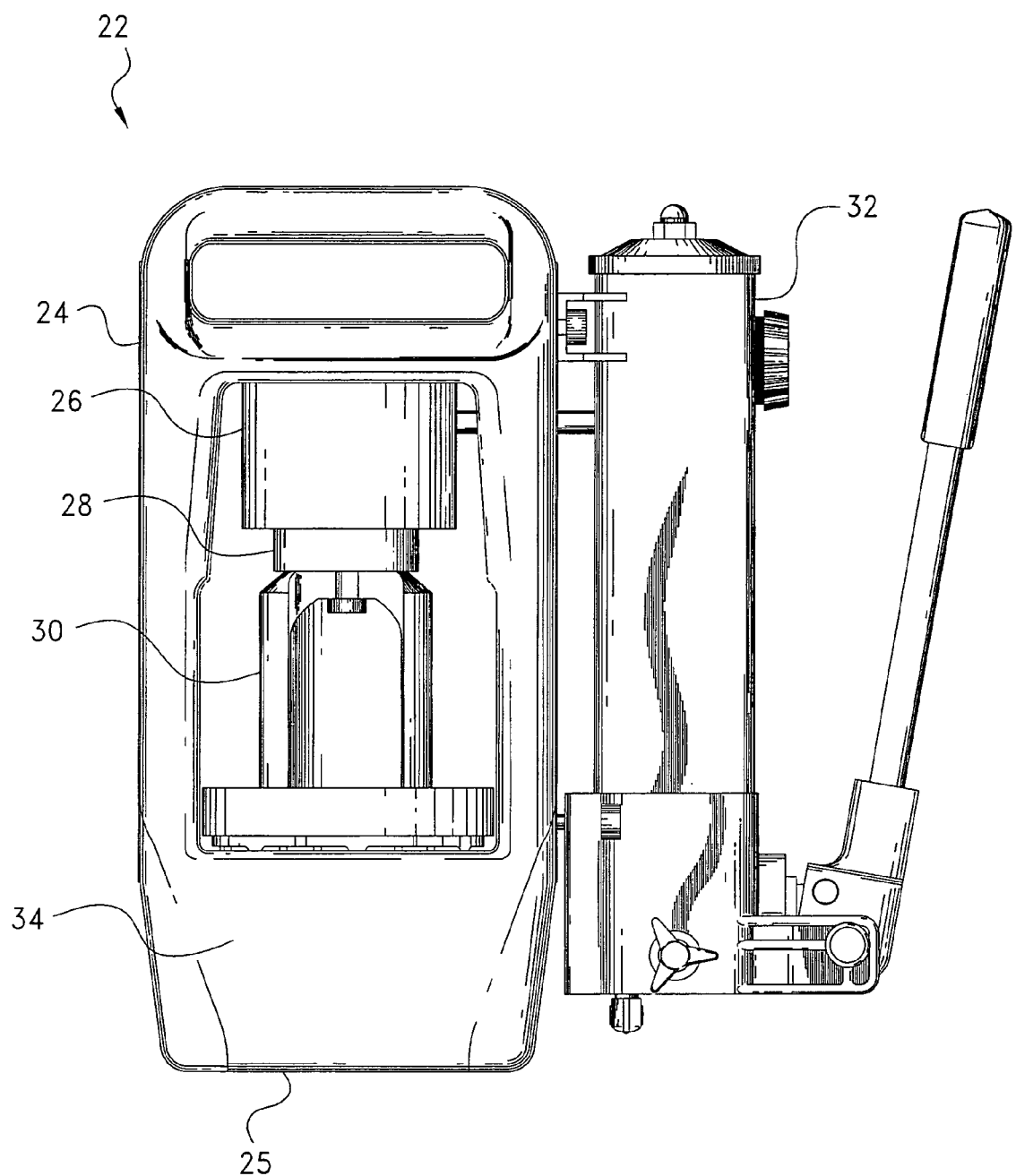
FIG. 2 is a front elevational view of a portable crimping device of the type utilized with the folding stand of the present invention.
Figure 3:
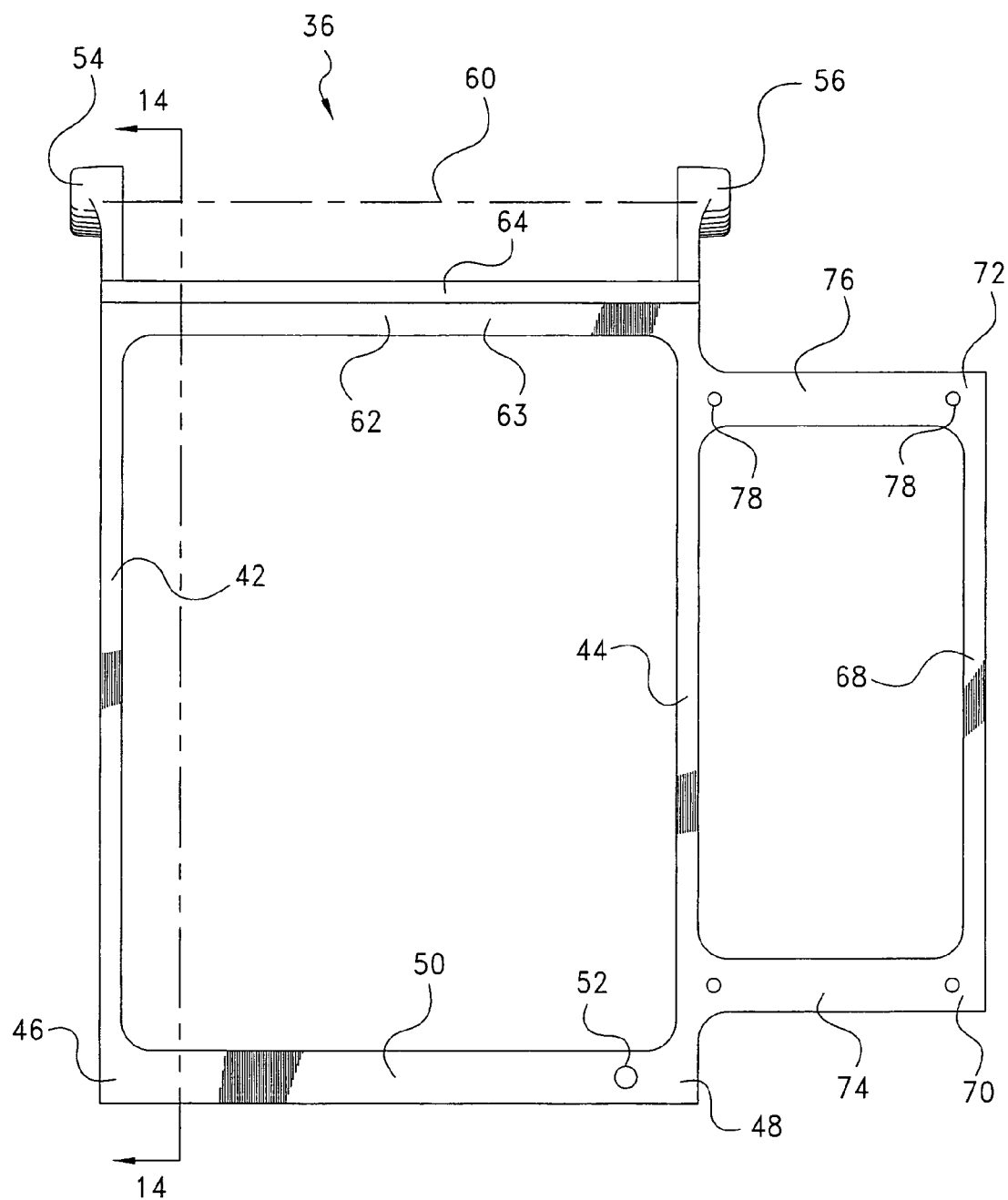
FIG. 3 is a top plan view of the base part of the folding stand of the present invention.
Figure 4:
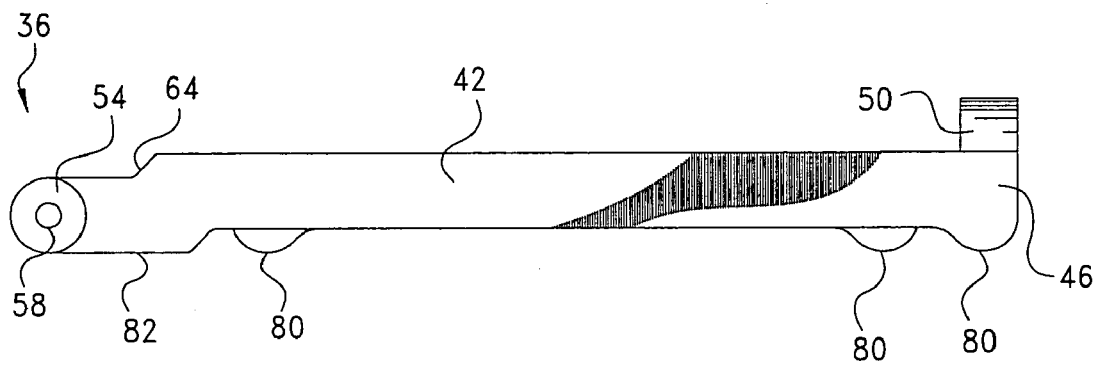
FIG. 4 is a left end view of the base part of FIG. 3.

Turning now to the several drawings, illustrated in the perspective view of FIG. 1 and indicated generally at 20, is the folding stand of the present invention, in its working position, together with a housing 24, shown in phantom lines, of a portable crimping device 22, shown in more detail in FIG. 2. Crimping device 22, illustrated merely to indicate the mechanism with which folding stand 20 finds utility and forming no part of the present invention, is set forth in detail in previously-noted U.S. Pat. No. 6,715,335 B2, to Huebner et al., the disclosure of which is fully incorporated herein by reference. For ease of understanding, crimping device 22 includes noted one piece housing 24 having a bottom surface 25 with a plurality of threaded perpendicular bores (not shown), a hydraulic cylinder 26, a spring loaded piston 28 movably situated within hydraulic cylinder 26, a removable die pusher 30, and a removably attachable, manually operated hydraulic pump 32. Portable crimping device 22, which weighs about 45 pounds, without tooling, is utilized for permanently attaching a metallic end fitting (not shown) onto the end of a flexible hose (not shown), as illustrated in cited U.S. Pat. No. 6,715,335 B2, in a manner well known in the art.

Figure 5:
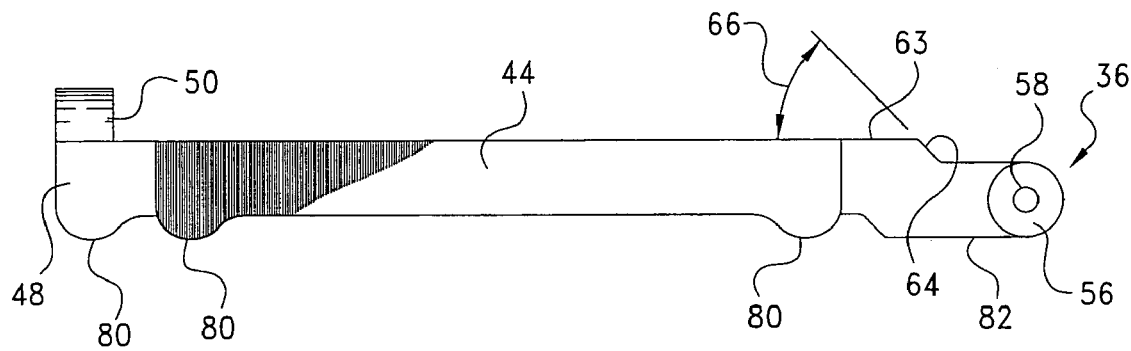
FIG. 5 is a right end view of the base part of FIG. 3.
Figure 6:
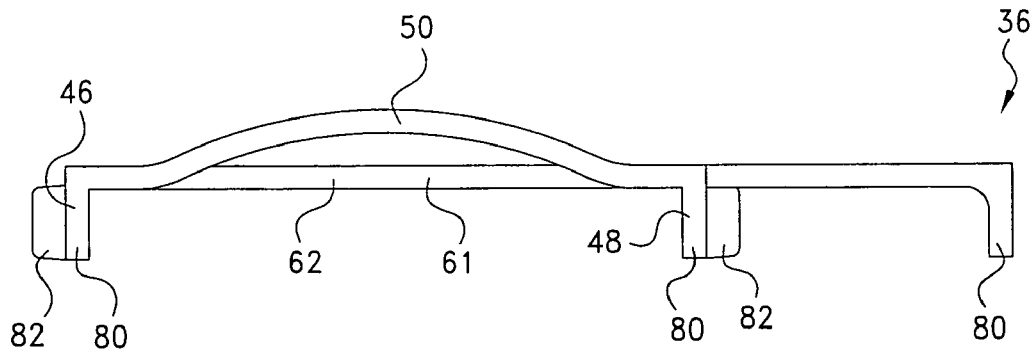
FIG. 6 is frontal plan view of the base part of FIG. 3.
Figure 7:
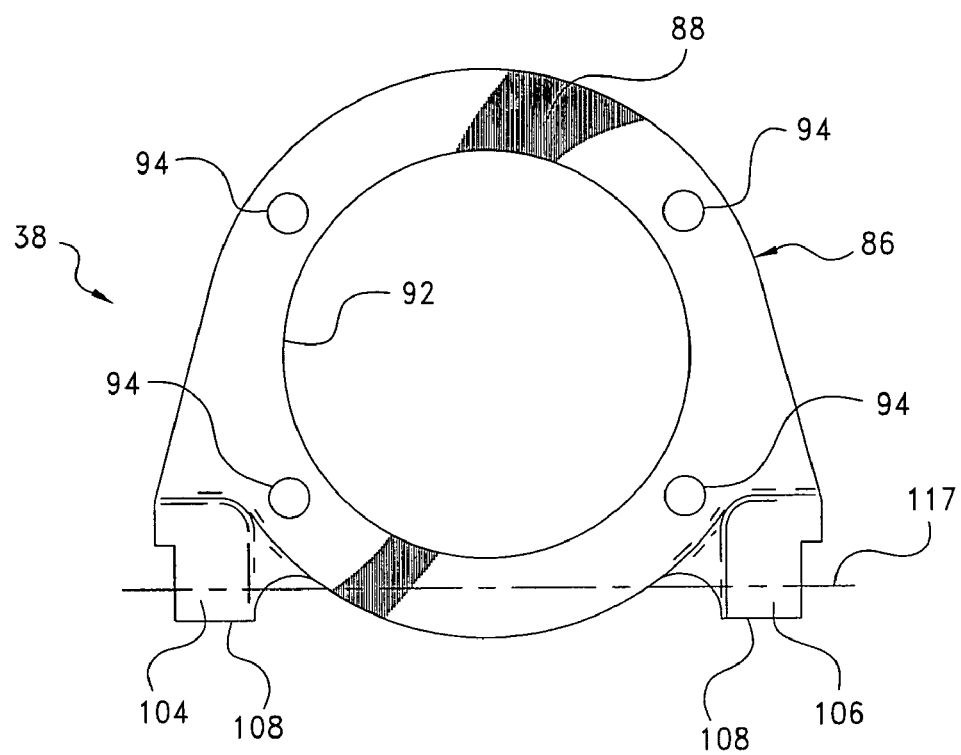
FIG. 7 is a top plan view of the stand mount of the folding stand of the present invention.
Figure 8:
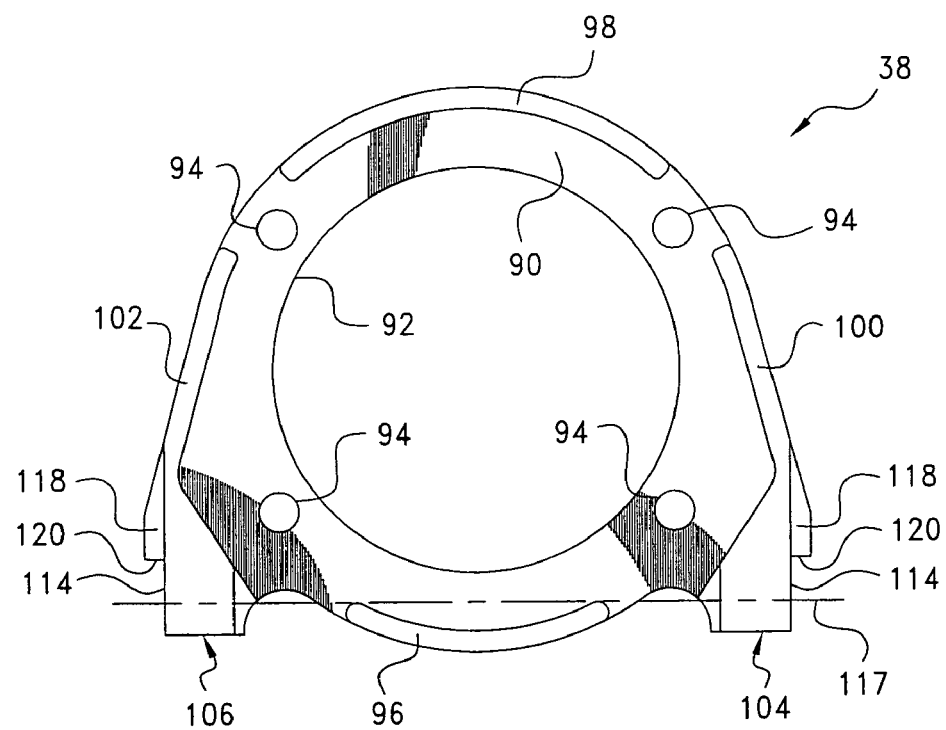
FIG. 8 is a bottom view of the stand mount of FIG. 7.
Figure 9:
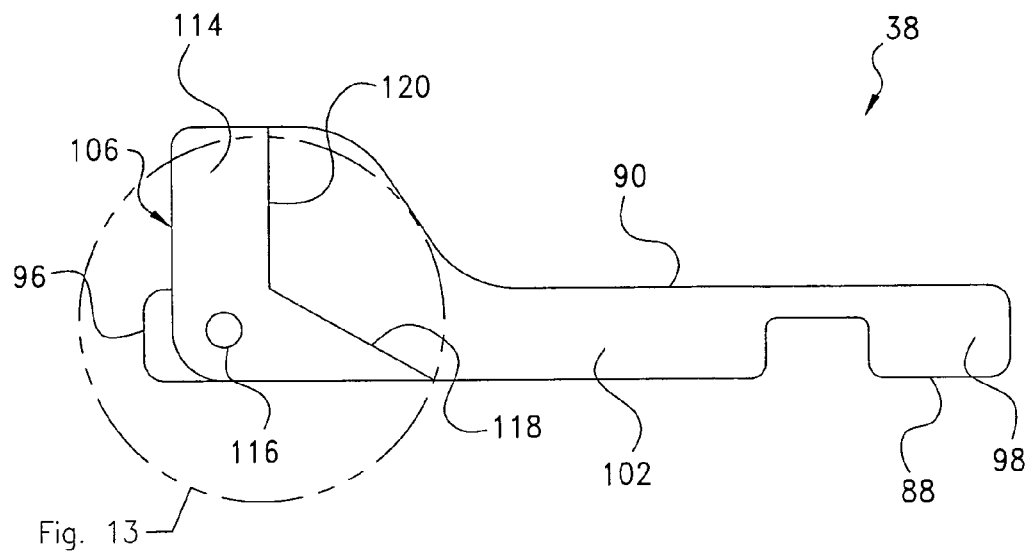
FIG. 9 is a left end view of the stand mount of FIG. 7.
Figure 10:
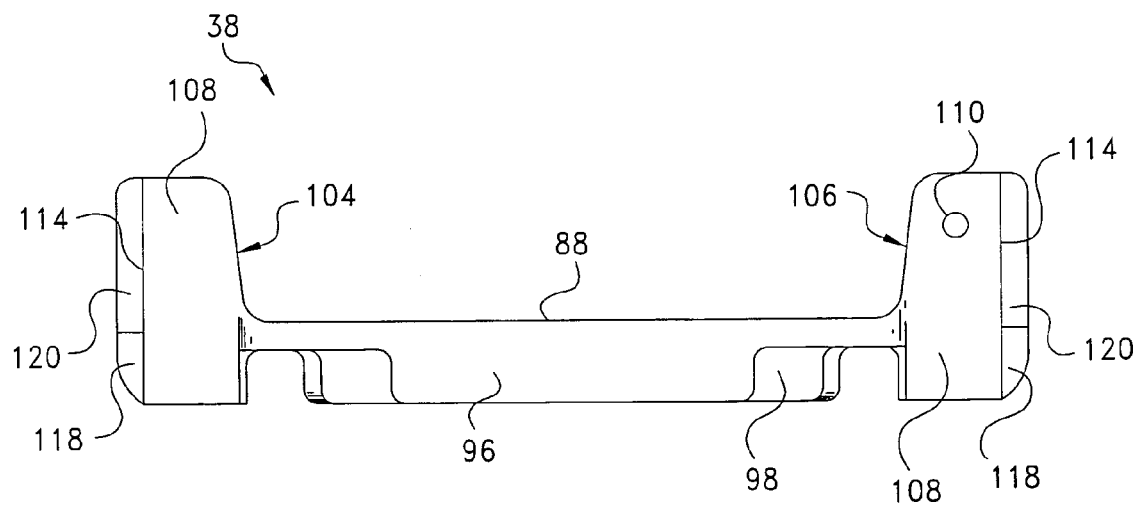
FIG. 10 is a front view of the stand mount of FIG. 7.
Figure 14:
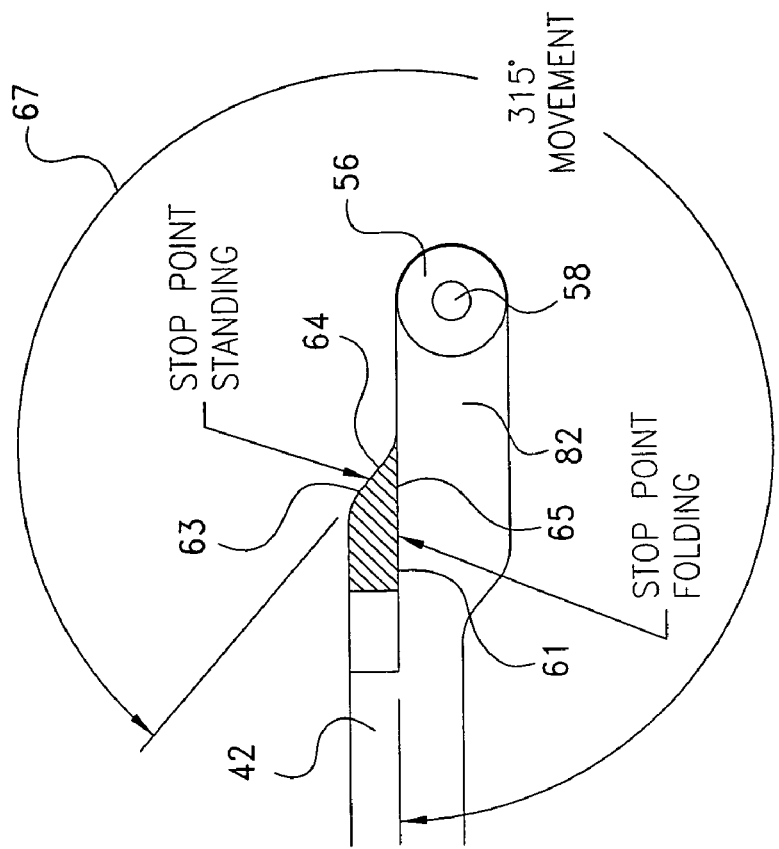
FIG. 14 is an enlarged partial view, partly in section, taken along line 14-14 of FIG. 3.

As illustrated in FIG. 1, folding stand 20 includes a base part or base portion 36 and a stand mount or mounting portion 38, interconnected via a pair of spaced, parallel, cross members 40, all of which will now be described in greater detail. Turning initially to FIGS. 3-6 and 14, illustrated therein are several views of base portion 36, preferably consisting of a metallic material, such as an aluminum alloy, although other materials, such as plastics and/or composites, or the like, may be utilized. Base portion 36 includes main chassis longitudinal, parallel, spaced and vertically-directed base members 42, 44, whose respective front or proximate end portions 46, 48, are rigidly connected via a transversely-directed, integral, arced front connecting portion 50, having a vertical, through aperture 52 near its right hand end, in the vicinity of member end portion 48. Rear or distal end portions 54, 56, respectively, of members 42, 44, are provided with coaxial, opposed, horizontally-directed, threaded apertures 58 residing in a common pivot axis 60. Main chassis members 42, 44, are rigidly connected, slightly inboard of their respective distal end portions 54, 56, via a transversely-directed, integral, straight, rear connecting portion 62 having an angled or tapered, integral rear or outside abutment portion or area 64 that forms an acute, inside 45 degree angle 66, as best seen in FIG. 5, with members 42 and 44. As best seen in FIG. 14, the leading edge of angled abutment portion or area 64, which also acts as a standing stop point surface area, merges into a bottom surface 65, parallel with a top surface 63 of rear connecting portion 62. The clockwise or reflex angle 67, between standing stop surface 64 and folded stop point surface 65 provides for a maximum of 315 degree of rotational or angular movement. An auxiliary, longitudinal chassis member 68, parallel with main chassis member 44, is connected to the side thereof not connected to chassis member 42, at its ends 70, 72, via spaced, transversely-directed, integral connecting portions 74, 76. Each connecting portion 74, 76, is provided, near its ends, adjacent to members 44 and 68, with two lateral, spaced threaded, through bores 78. The four threaded bores 78 are spaced, in a predetermined manner, so as to permit, if so desired, the fastening, to connecting portions 74, 76, via bolts (not shown) of previously-noted hydraulic pump 32 that is normally bolted to one side of crimping device 22 (FIG. 2), using its existing bolt holes. Finally, the ends 46, 48, 70 and 72 of chassis members 42, 44 and 68, respectively, are provide with similar, short, curved foot portions 80, while main chassis member ends 54 and 56 are provide with elongated, vertical, foot portions 80, with the outer or lowermost surface of each of the noted foot portions defining a an area in a common plane (not shown) that, in turn, defines the footprint of base portion 36.

Figure 13:
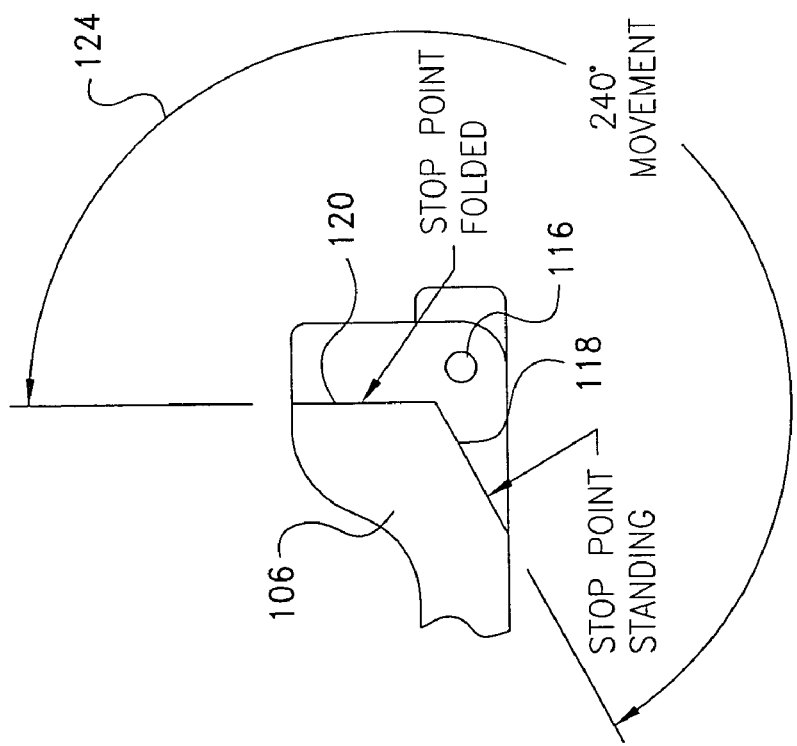
FIG. 13 is an enlarged view similar to that of the circled area B in FIG. 9.

Turning now to FIGS. 7-10 and 13, illustrated therein are several views of stand or mounting portion 38, again preferably consisting of an aluminum alloy, although other materials, as previously noted, may also be utilized. Mounting portion 38, which is generally ring-shaped, includes a body portion 86 having a top surface 88, a bottom surface 90, a central aperture 92 and four through bores 94, equally spaced around and parallel with central aperture 92. Extending perpendicularly from bottom surface 90 are spaced, curved, reinforcing or stiffening, opposed rib portions 96, 98 as well as opposed rib portions 100, 102, with rib portions 100, 102 merging smoothly into spaced, opposite attachment bosses 104, 106, respectively. Bosses 104, 106, are allochiral or mirror images of each other, thus only the end of boss 106 is illustrated in detail in FIG. 9. Thus, each of bosses 104, 106, includes an outer end surface 108, with only surface 108 of boss 106 being provided with a perpendicular, threaded bore 110. Each of bosses 104, 106, is also provided with a lateral attachment portion 114 having a laterally-directed threaded bore 116 residing in a common pivot axis 117 parallel with base portion pivot axis 60, an angled standing stop point working position surface area or tapered surface area 118 as well as a straight folded stop point working position surface area or retracted position surface area 120. As best seen in FIG. 13, the clockwise movement or reflex angle 124, between folded stop point surface 120 and standing stop point surface 118 provides for a maximum 240 degree of rotational or angular movement. Stand mount or mounting portion 38 is adapted to be connected with crimping device 22 by locating the latter above mounting portion 38 so that its top surface 88 abuts and is coplanar with crimping device bottom surface 25 in a manner so that a plurality of conventional metal bolts (not shown) can have their threaded portions extend through bores 94 and into mating, fixed, engagement with the threaded bores (not shown) in crimping device bottom surface 25. If it is desired, since it is not mandatory, to remove and relocate the previously-noted hydraulic pump 32 from crimping device 22 onto folding stand base portion 36, it should be understood that a high pressure hydraulic hose (not shown) and a quick disconnect coupler (not shown) will also be required.

Figure 11:
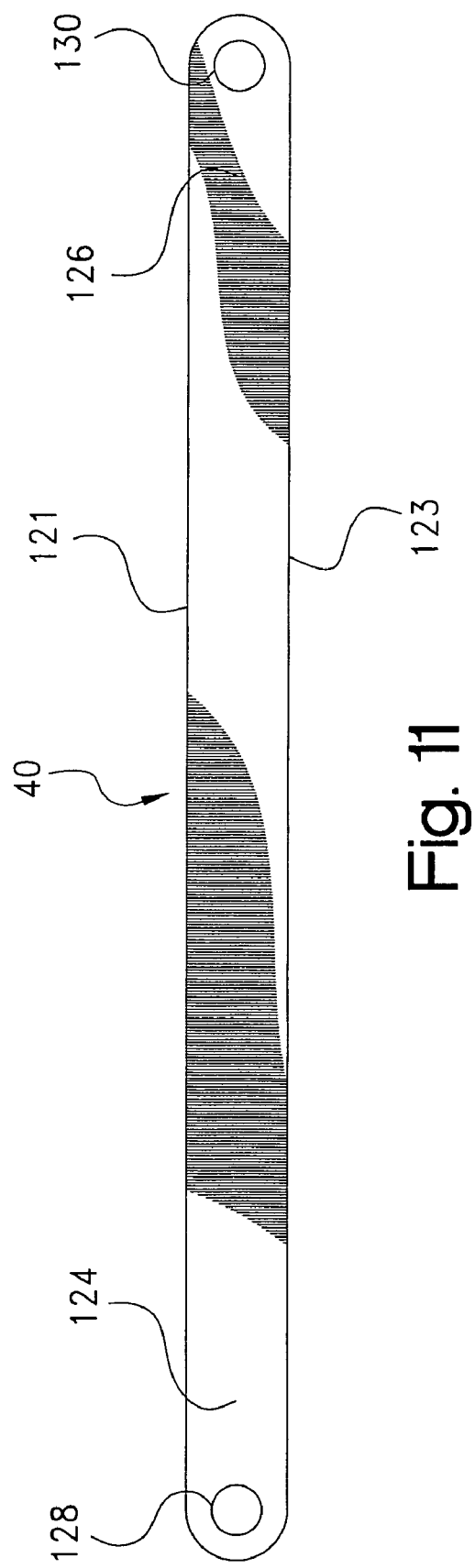
FIG. 11 is a side view of one of the cross members of the folding stand of the present invention.
Figure 12:
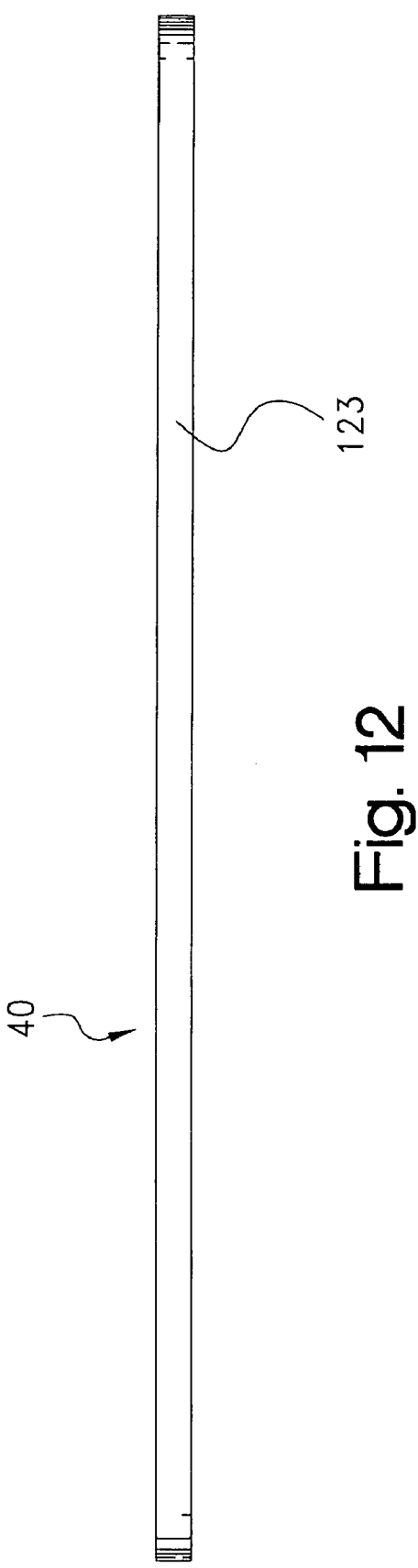
FIG. 12 is an edge view of the cross member of FIG. 11.

Continuing now with FIGS. 11 and 12, illustrated therein is one of the pair of cross members 40, preferably again comprised of a metallic materials, such as fabricated steel bar stock, although other materials, as previously noted, may be utilized. Each cross member 40 has a top surface 123 and a bottom surface 123 as well as first and second ends 124, 126, with lateral through bores 128, 130, respectively. As best seen in FIGS. 1 and 15B-15G, cross members 40 have their first ends 124 operatively interconnected, via conventional, preferably stainless steel material shoulder bolts 134 (not shown in detail), extending, via apertures 128 and threaded apertures 58, into opposed main chassis member distal ends 54, 56. The use of shoulder bolts 134 presents an economical way to produce pin type joints at the noted locations Upon the just noted interconnection, cross members 40 can rotate, about shoulder bolts 134, from folded stop point area 65 to standing stop point area 63 and vice versa, through reflex angle 67 (FIG. 14), for the noted maximum of 315 degrees of rotational movement. Again, as best seen in FIGS. 1 and 15A-15G, cross members 40 have their second ends 126 operatively interconnected, via additional, similar, shoulder bolts 136, extending via apertures 130 and threaded bores 116, with lateral attachment bosses 104, 106 of stand mount 38. Thus, cross member second ends can rotate, about shoulder bolts 136, from folded stop point area 120 to standing stop point area 118 (FIG. 13), for the noted maximum 240 degrees of rotational movement. When cross bars 40 are in their folded position, relative to folding stand base portion 36, folded stop point areas 65 (FIG. 14) of the latter abut or make contact with cross bar bottom surface 123, at cross bar ends 124, and when cross bars 40 are in their folded position, relative to mounting portion 38, folded stop point areas 120 (FIG. 13) of the latter abut or make contact with cross bar top surface 125, at cross bar ends 126. When folded, in the just described manner, base portion aperture 52 (FIG. 3) is axially aligned with threaded bore 110 (FIG. 10) in stand mount attachment boss 106. A conventional preferably knurled, threaded bolt (not shown), having its threaded portion extending through aperture 52 can then be threaded, into operative engagement with bore 110, thereby locking base portion 36 to mounting portion 38 and, together with crimping device 22 produce the fully folded or at-rest position of folding stand 20 in the manner illustrated in FIG. 15A. When it is desired to release folding stand 20, from its locked position, the noted knurled bolt is removed and thereafter stored by threading same into threaded bore 110. It should be clear that portable crimping device 22 can fully function in its usual and intended manner when folding device 20 is fully folded, in the manner previously described, since none of its structural components interfere with the assembly or operation of crimping device 20.

Figure 15C:
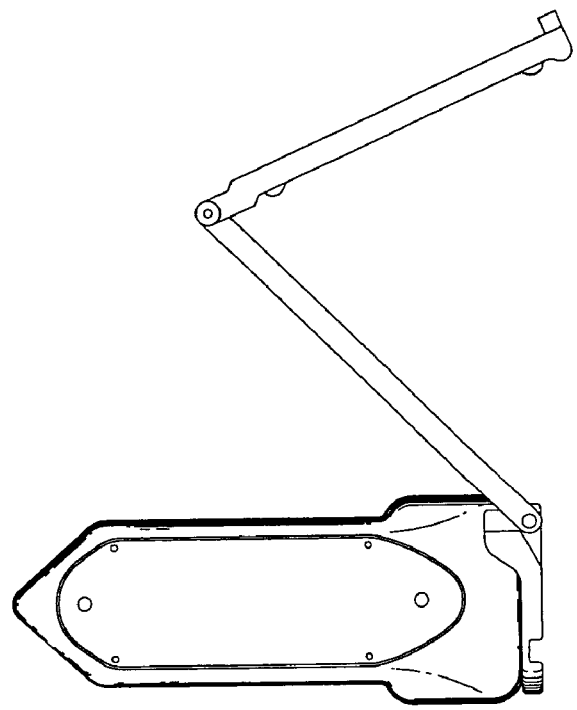
Figure 15B:
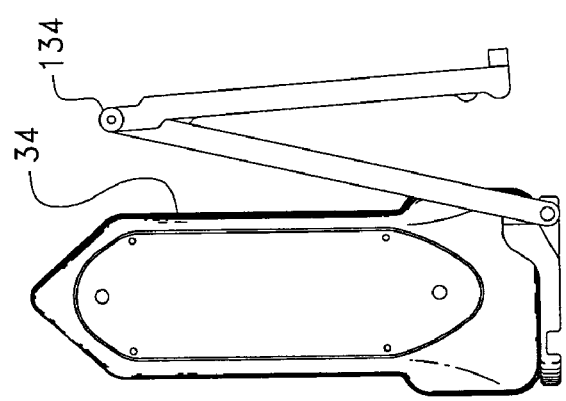
Figure 15A:
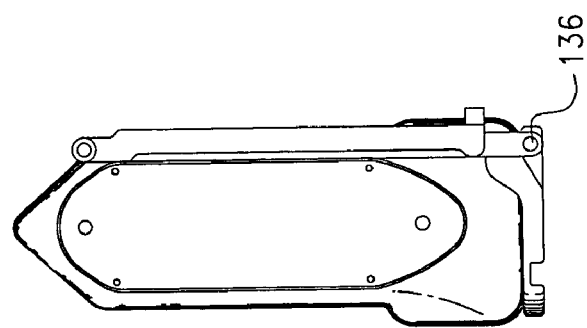
Figure 15G:
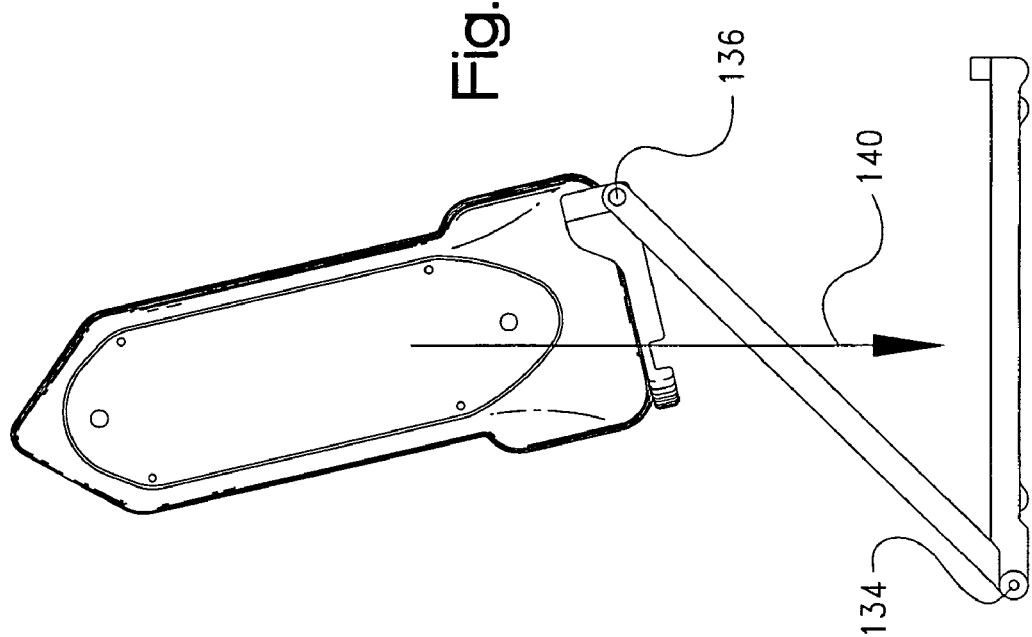
Figure 15F:
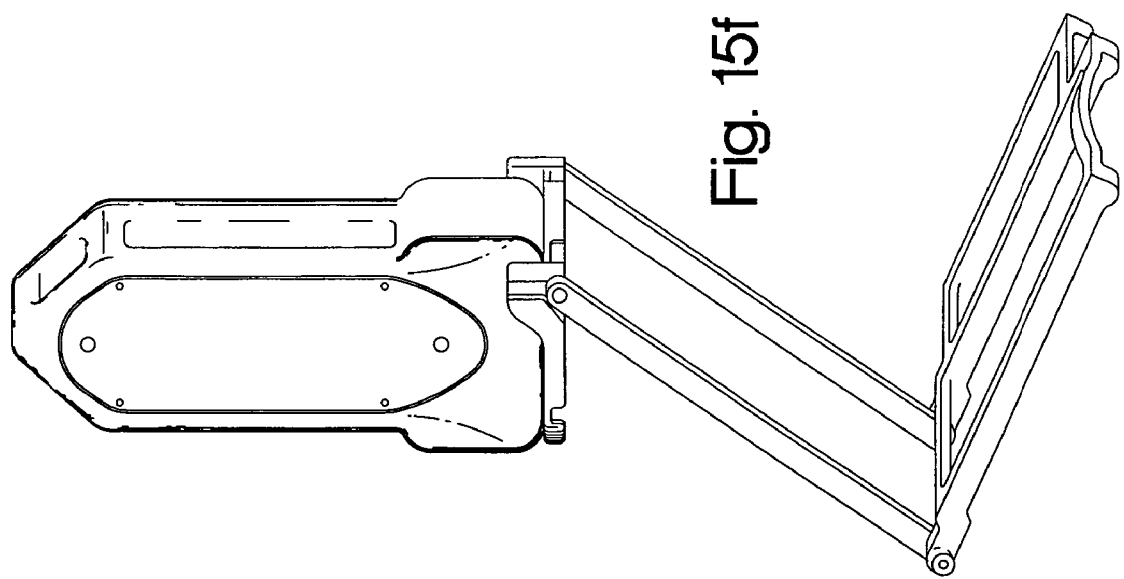

In terms of operation, once folding stand 20 is released from its locked position, relative to crimping device 22 (FIG. 15A), stand 20 is unfolded in the manner graphically illustrated in the series of progressive steps shown in FIGS. 15B through 15F, thus arriving at the fully unfolded position thereof shown in FIG. 15G. In the FIG. 15G position, cross bar top surfaces 121 of second ends 126 abut or make contact with standing stop point surfaces 118 of stand mount attachment bosses 106, 108, while cross bar bottom surfaces 123 of first ends 124 abut or make contact with standing stop point surfaces 64 of base portion 36. No separate locking mechanism is required to keep folding stand 20 in its standing position, instead, it relies on the center of gravity of crimping device 22, indicated by arrow 140 in FIG. 15G, with the mass of crimping device 22 acting, via the force of gravity, through the previously noted standing stop point surfaces 64 and 118 (FIGS. 13, 14) on folding stand 20. It should be understood that a reversal of the just described unfolding procedure will result in stand 20 being in its folded position, adjoining the front face 34 of crimping device 22. The previously noted, not-illustrated threaded bolt or fastener can then be utilized to secure base portion 36 to mounting portion 38, thus securing folding stand 20, in its fully folded or at-rest position, to crimping device 22, thereby permitting the portability of the stand/crimping device combination as but a single unit.

It should also be understood, at this time that the use of preferably lightweight material, such as, for example, an aluminum alloy, for the base portion 36 and mounting portion 38, aids in limiting the weight of folding stand 20 to about four pounds and that the previously described kinematical folding design permits ready unfolding and subsequent refolding thereof. In addition, the minimum size of folding stand 20 contributes to its ease of portability along with crimping device 22, while not interfering with the operation and/or function of crimping device 22, even when stand 20 is fully folded.

It is deemed that one of ordinary skill in the art will readily recognize that the present invention fills remaining needs in this art and will be able to affect various changes, substitutions of equivalents and various other aspects of the invention as described herein. Thus, it is intended that the protection granted hereon be limited only by the scope of the appended claims and their equivalents.

What is claimed is:

1. A foldable stand for a portable crimping device, said foldable stand being adapted to be secured to a horizontal bottom wall surface of said crimping device, said foldable stand comprising in combination:
   a. a base portion, including a pair of spaced, main chassis, longitudinal base members, interconnected, on first ends thereof, via a first transversely directed connecting portion and interconnected, inboard of second ends thereof, via a second transversely directed connecting portion, said base member second ends each having a horizontal coaxial first pivot aperture in a common first pivot axis, said second connecting portion including a pair of laterally separated, coplanar, first stop point folding areas and a circumferentially spaced pair of laterally separated, coplanar, first stop standing point areas;
   b. a mounting portion, including a generally ring shaped body portion having a top surface, a bottom surface, a central aperture, a plurality of spaced through bores and a pair of aligned, spaced, attachment bosses, at opposite sides of a front end portion of said body portion, said attachment bosses each including a lateral, vertical attachment portion c. having an opposed, horizontal coaxial second pivot aperture in a common second pivot axis, parallel with said first pivot axis, each attachment boss including a second stop point folding area, in first common plane, and a circumferentially spaced second stop point standing area, in a second common plane;
   c. a pair of elongated cross members, each having a top surface, a bottom surface and first and second ends having first and second through bores, respectively;
   d. a first pair of oppositely directed fastening members for pivotally connecting said first ends of said cross members, via said first bores, with respective ones, of said base portion second ends, via said first pivot apertures, thereby permitting relative movement, between said base portion and said cross members, for a first predetermined reflex angle between said first stop point folding areas and said first stop point standing areas; and e. a second pair of oppositely directed fastening members for pivotally connecting said second ends of said cross members, via said second bores, with respective ones, of said mounting portion attachment bosses, via said second pivot apertures, thereby permitting relative movement between said mounting portion and said cross members, for a second predetermined reflex angle between said second stop point folding areas and said second stop point standing areas.

2. The foldable stand of claim 1, wherein said first predetermined reflex angle has an angular extent of about 315 degrees.

3. The foldable stand of claim 1, wherein said second predetermined reflex angle has an angular extent of about 240 degrees.

4. The foldable stand of claim 1, wherein, when said cross members abut said first and second stop point standing areas, respectively, said foldable stand is in an unfolded position.

5. The foldable stand of claim 4, wherein said folding stand, in its unfolded position, utilizes the mass of said portable crimping device, acting via its center of gravity, through said first and second stop point standing areas, to retain said foldable stand in the unfolded position.

6. The foldable stand of claim 1, wherein, when said cross members abut said first and second stop point folding areas, respectively, said foldable stand is in a folded position.

7. The foldable stand of claim 6, wherein one of said mounting portion attachment bosses includes, in an outer end surface thereof, a further bore portion and said base portion first connecting portion includes a further through bore, said further bore and through bore being axially aligned when said foldable stand is in said folded position, with an additional fastening member, extending, through said further through bore into said further bore, being adapted to fixedly retain said base portion to said mounting portion, in said folded position, thus fixedly securing said folding stand, in its folded position, to said portable crimping device and being portable therewith.

8. The foldable stand of claim 7, wherein, in said folded position of said folding stand, said folded stand adjoins a front surface portion of said portable crimping device.

9. The foldable stand of claim 7, wherein said attachment boss further bore portion serves as retainer for said additional fastening member when said folding stand is in its unfolded position.

10. The foldable stand of claim 1, wherein said bottom wall surface of said portable crimping device abuts the top surface of said mounting portion and is secured thereto, via a plurality of further fastening members, extending through said plurality of through bores, in the body portion of said mounting portion, into a plurality of aligned bores in said crimping device bottom wall surface.

11. The foldable stand of claim 1, wherein said first and second pairs of fastening members take the form of stainless steel shoulder bolts.

12. The foldable stand of claim 1, wherein said first transversely directed connecting portion includes an arced center portion that can serve as an operator handle during folding and unfolding of said foldable stand.

13. The foldable stand of claim 1 further including a parallel, auxiliary chassis, longitudinal base member, interconnected, on opposed ends thereof, via further transversely directed connecting portions, with one of said main chassis, longitudinal base members, inboard of the ends thereof.

14. The foldable stand of claim 13, wherein the further connecting portions of said auxiliary chassis base member include a plurality of spaced through bores, said through bores being aligned with matching through bores in the base portion of a hydraulic pump normally mounted on a side surface of said portable crimping device, thereby permitting the mounting of said pump, via suitable fastening members, to said base portion.

15. The foldable stand of claim 13, wherein the ends of bottom surfaces of said main and auxiliary chassis longitudinal base members are provided with respective foot portions, with the lowermost surface of each of said foot portions defining an area in a common plane, that, in turn, defines the footprint of said base portion.

* * * * *